(12) United States Patent
Lange et al.

(10) Patent No.: US 10,899,390 B2
(45) Date of Patent: Jan. 26, 2021

(54) SELF-SUPPORTING UNDERFRAME FOR A VEHICLE AND SUCH A VEHICLE

(71) Applicant: Carbon Truck & Trailer GmbH, Stade (DE)

(72) Inventors: Hans Jürgen Lange, Hamburg (DE); Ria Kaiser, Hamburg (DE); Gerret Kalkoffen, Hamburg (DE)

(73) Assignee: Carbon Truck & Trailer GmbH, Stade (DE)

( * ) Notice: Subject to any disclaimer, the term of this patent is extended or adjusted under 35 U.S.C. 154(b) by 68 days.

(21) Appl. No.: 15/751,675

(22) PCT Filed: Jul. 29, 2016

(86) PCT No.: PCT/EP2016/068170
§ 371 (c)(1),
(2) Date: Feb. 9, 2018

(87) PCT Pub. No.: WO2017/025358
PCT Pub. Date: Feb. 16, 2017

(65) Prior Publication Data
US 2018/0229773 A1      Aug. 16, 2018

(30) Foreign Application Priority Data
Aug. 11, 2015   (DE) .................... 20 2015 104 222 U

(51) Int. Cl.
*B62D 23/00* (2006.01)
*B62D 29/04* (2006.01)
(Continued)

(52) U.S. Cl.
CPC ............. *B62D 23/00* (2013.01); *B62D 21/02* (2013.01); *B62D 21/10* (2013.01); *B62D 21/11* (2013.01);
(Continued)

(58) Field of Classification Search
CPC ........ B62D 21/18; B62D 21/11; B62D 21/10; B62D 21/02; B62D 23/00; B62D 25/20;
(Continued)

(56) References Cited

U.S. PATENT DOCUMENTS 5,833,023 A    11/1998  Shimizu
6,203,099 B1    3/2001  Iwatsuki
(Continued)

FOREIGN PATENT DOCUMENTS

BR    PI0415368    12/2006
CH    699569    3/2010
(Continued)

OTHER PUBLICATIONS

Pultrusion for Engineers. Woodhead Publishing Limited, Abington Cambridge. CRC Press. (2000).

*Primary Examiner* — Joseph D. Pape
*Assistant Examiner* — Dana D Ivey
(74) *Attorney, Agent, or Firm* — Sand, Sebolt & Wernow Co., LPA

(57) ABSTRACT

A self-supporting underframe for a vehicle, the vehicle, and a production method thereof. The underframe has two elongate monocoques arranged parallel and spaced apart from each other and at least 50% closed on at least four sides, wherein the monocoques each have a single-part, trough-like element having at least one lower base and two side walls extending upwards from the base. At least one cover element closes the trough-like elements over at least 50% of the longitudinal extent of the particular trough-like element. The at least one cover element of each of the two monocoques in each case includes at least one cross-strut cover element, and the cross-strut cover elements of the two monocoques are designed as a common, single-part cross-strut cover element spanning an intermediate space located
(Continued)

between the trough-like elements of the monocoques. The cover elements are fixedly connected to the side walls of the monocoques.

18 Claims, 3 Drawing Sheets

(51) Int. Cl.
    *B62D 21/11*     (2006.01)
    *B62D 25/20*     (2006.01)
    *B62D 21/02*     (2006.01)
    *B62D 29/00*     (2006.01)
    *B62D 21/18*     (2006.01)
    *B62D 21/10*     (2006.01)

(52) U.S. Cl.
    CPC ............ *B62D 21/18* (2013.01); *B62D 25/20* (2013.01); *B62D 29/005* (2013.01); *B62D 29/041* (2013.01); *B62D 29/046* (2013.01)

(58) Field of Classification Search
    CPC ... B62D 29/005; B62D 29/041; B62D 29/046
    USPC ......................................................... 296/204
    See application file for complete search history.

(56) References Cited

U.S. PATENT DOCUMENTS

| | | | | |
|---|---|---|---|---|
| 7,010,874 | B2 * | 3/2006 | Uchijima | E02F 3/6273 |
| | | | | 172/272 |
| 7,210,413 | B2 * | 5/2007 | Barry | B60P 3/20 |
| | | | | 105/355 |
| 8,047,603 | B2 | 11/2011 | Goral et al. | |
| 8,530,015 | B2 * | 9/2013 | Mendiboure | B62D 29/002 |
| | | | | 428/36.5 |
| 2009/0179461 | A1 * | 7/2009 | Fuchs | B62D 25/2036 |
| | | | | 296/204 |
| 2010/0244496 | A1 * | 9/2010 | Bellanger | B62D 21/02 |
| | | | | 296/204 |
| 2015/0266515 | A1 | 9/2015 | Hulbert | |
| 2016/0137229 | A1 | 5/2016 | Nishida et al. | |

FOREIGN PATENT DOCUMENTS

| | | |
|---|---|---|
| CN | 201317398 | 9/2009 |
| CN | 103010321 | 4/2013 |
| CN | 103906675 | 7/2014 |
| DE | 1505593 | 1/1970 |
| DE | 3803603 | 8/1989 |
| DE | 4340445 | 6/1995 |
| DE | 19608127 | 9/1997 |
| DE | 19912173 | 9/1999 |
| DE | 10156875 | 5/2003 |
| DE | 10164675 | 7/2003 |
| DE | 60018628 | 8/2005 |
| DE | 102010014574 | 10/2011 |
| DE | 202012103583 | 12/2012 |
| DK | 1609704 | 12/2007 |
| EP | 0618128 | 8/1997 |
| EP | 1464567 | 10/2004 |
| EP | 2778025 | 9/2014 |
| ES | 2214788 | 9/2004 |
| ES | 2551287 | 11/2015 |
| GB | 2367270 | 4/2002 |
| GB | 2513146 | 10/2014 |
| JP | 2013220734 | 10/2013 |
| JP | 2014054963 | 3/2014 |
| KR | 101251758 | 12/2012 |

* cited by examiner

SELF-SUPPORTING UNDERFRAME FOR A VEHICLE AND SUCH A VEHICLE

BACKGROUND

Technical Field

The present invention relates to a self-supporting underframe for a vehicle and such a vehicle.

Background Information

Numerous underframes for vehicles are well known in the prior art.

In the recent past, underframes made of fiber composites were used. Here, especially underframes based on a monocoque have become widely accepted. Also, monocoques having reinforcing elements are known. For instance, elongated reinforcing elements arranged in a carrier trough are known.

SUMMARY

The present invention addresses the problem of specifying a novel chassis or underframe, which can take the increased demands on such frames into account. In particular, the mass shall be reduced, the stiffness and the absorbable forces shall be increased, and the result of an environment-oriented overall view shall be improved. In addition, it is also desired to facilitate production and transport, to render them cheaper and to conserve resources in doing so. In particular, it is therefore desirable to simplify fabrication, to minimize material waste and manual processes. This not only reduces energy consumption, but the installation work for the necessary machines is also significantly less. The problem is solved by a self-supporting base for a vehicle and a land vehicle comprising a self-supporting underframe, wherein the underframe has two elongated monocoques, arranged in parallel and spaced apart from each other, and closed on at least four sides over at least 50%, wherein the monocoques each have an integral trough-like element having at least one lower bottom and two side walls extending upwards from the bottom, and at least one cover element closing the trough-like elements over at least 50% of the lengthwise extent of the respective trough-like element, wherein the at least one cover element of each of the two monocoques comprises at least one strut cover element, and the strut cover elements of the two monocoques are formed as a common integral strut cover element spanning the interstice located between the trough-like elements of the monocoques, and the cover elements are firmly connected to the side walls of the monocoques. A method of producing the self-supporting underframe for a land vehicle and/or a land vehicle having a self-supporting underframe comprises the following steps for the production of the underframe. Advantageous developments include that the monocoques each have a first section and a second section, wherein the second section, in a center plane through the two trough-like elements of the monocoques, parallel to the lengthwise extents of the trough-like elements of the two monocoques, has a greater extent perpendicular to the lengthwise extent of the trough-like element of the monocoque than the first section, and wherein every monocoque has a third section located between the first and second sections in the direction of the lengthwise extent of its trough-like element, which third section has a decreasing extent from the second to the first section over the lengthwise extent of its trough-like element, and in particular the two monocoques have along their lengthwise extent only the first section, the third section adjacent thereto and the second section adjoining the third section. The two monocoques have, along their lengthwise extent, only the first section, the third section adjoining thereto and the second section adjoining the third section and a fourth section. At least one central cross-bracing extends between the two monocoques, wherein the at least one central cross-bracing is firmly connected to the two monocoques. The at least one central cross-bracing comprises an integral trough-like element having at least one lower bottom and two side walls extending upwards from the bottom and at least one cover element closing the trough-like elements over least 50% of the lengthwise extent of the individual trough-like element, and the cover element is firmly connected to the side walls, in particular using binding agents, wherein the at least one cover element is in particular part of the at least one strut cover element. Furthermore, the monocoques are hollow except for the inner cross-bracings and/or the monocoques are closed on five sides. The trough-like elements have reinforcing elements or connecting elements for reinforcing elements over a maximum of 70%, in particular a maximum of 50%, of their lengthwise extent. The inner and/or central cross-bracings are arranged perpendicular to the lengthwise extent of the monocoques. Additionally, the two monocoques are designed as identical, and their bottoms are arranged on a common plane and the two monocoques are arranged as mirror images in relation to a plane perpendicular to the common plane. The trough-like elements have adhesive surfaces extending parallel to one another from the ends of the side walls facing away from the bottoms and in particular extending outwards from the side walls, wherein the cover element is connected to the trough-like elements using binding agents on the adhesive surfaces. The adhesive surfaces have a constant width over the lengthwise extents of the monocoques and/or central cross-bracings. At the first end, a vehicle element having at least one front axle, in particular a tractor, is mounted, in particular bolted, and/or the monocoques have devices for bolting to an underframe or a cabin in the first section or at the first end. The method of manufacture of the trough-like elements and/or sections may be accomplished by a pultrusion method. The method may include the manufacture of a land vehicle having a chassis, wherein the underframe is the chassis or part of the chassis.

In accordance with the method, initially two trough-like elements according to the invention are provided for the formation of the monocoques and arranged correspondingly, and then a strut cover element according to the invention is fixedly connected to the two monocoques using binding agents. The connection can be made directly and/or indirectly, for instance via flanges and/or outwardly extending adhesive surfaces. With particular advantage, cross-bracings, advantageously one cross-bracing, in particular two or three cross-bracings, are arranged, before or after the connection to the strut cover element, between the monocoques and in particular connected to these, in particular using a binding agent and in particular subsequently the cover element or the cover elements are attached. To manufacture a land vehicle, the underframe is used as the underframe of the land vehicle.

According to the method, the trough-like elements, which may also be formed by trough-like sections, are provided or manufactured in particular as described below. In particular, prior to connection to the at least one strut cover element, they are aligned and arranged relative to one another as described below. With further advantage, in addition to the at least one strut cover element, which is a cover element, at least one further cover element for partially closing at least one trough-like element is connected thereto.

In practical terms, the underframe has two trough-like elements spaced apart from one another, which are connected to one another by at least one strut cover element according to the invention, which is connected to the two trough-like elements by means of binding agents. The land vehicle has such an underframe. In doing so, the trough-like elements and parts of the strut cover element form two monocoques and/or are part of two monocoques.

In relation to the trough-like elements, the monocoques, the strut cover element, the cross-bracings and the cover element, their formation, arrangement and connection, the advantageous embodiments executed in relation to the underframe or the land vehicle shall also be regarded as advantageous embodiments of the method, which can be implemented by a corresponding choice of such elements and/or their use and/or a corresponding arrangement and/or connection.

The basic feature of the underframe or land vehicle according to the invention is the use of two monocoques, thus the formation of a duocoque with interposed strut and/or connection, wherein the strut and/or connection is at least partially part of each of the two monocoques. Numerous advantages can be achieved using such a construction. The strut and/or connection is firmly connected to the trough-like elements. This can be done directly and/or indirectly, for instance using flanges and/or outwardly extending adhesive surfaces. Not only can a good overall environmental balance, high load-bearing capacity and stiffness and a low weight be combined with each other, but also a nonvariable part production of the two trough-like elements and/or monocoques can be achieved. In addition, the relatively small monocoques can be manufactured using a significantly lower contact pressure and/or in a continuous process and thus using much lighter and simpler machines and using fewer resources. In addition, the trough-like portions of the monocoques can also be designed to be stackable and the trough-like portions of the monocoques and the cover elements are easy to handle and transport. The trough-like elements are, in particular, designed as elongated trough-like elements whose length significantly exceeds their height and width. In particular, in the cross section parallel to the width of the trough-like element, said element has a trough-like or at least partially U-shaped cross section.

Suitable binding agents are, for instance, polymers and/or resins, for instance epoxy resins. Such binding agents can be used both for connecting the parts, for instance the trough-like elements to a strut cover element, and as binding agents within the fiber composite material, from which, for instance, the trough-like elements may be formed.

The self-supporting underframe according to the invention for a vehicle, in particular a land vehicle, is suitable for being used as an underframe to which further elements, such as axles, wheel suspensions and superstructures, are fastened. In particular, however, it is preferred if the self-supporting underframe or land vehicle is designed such that at a first end of every monocoque and/or at least one cover element, in particular strut cover element, a (common) contiguous structure having at least one axle, is, can be and/or will be installed, tethered to both monocoques and/or the at least one cover element, in particular strut cover element. In this case it is particularly preferred if part of the tethered or tetherable structure is a driver's cab or the like. It is also preferable if the first end is an end located forward in the direction of travel. The self-supporting underframe according to the invention, in particular its monocoques and/or cover elements, thus does not/do not extend in particular along the entire length of a land vehicle, part of which is the underframe according to the invention, and also not completely between all its axles. For this purpose, advantageously at a first end of every monocoque and/or at least one cover element, in particular strut cover element, corresponding devices for connecting to such a tethered/tetherable structure are provided. Such a connection is preferably made using bolts. For this purpose, threads and/or bolt penetrations, in particular metallic, may be provided at a first end of the monocoque and/or the at least one cover element, in particular strut cover element.

The trough-like elements need not be made like a trough over the entire extent of the respective part, they may also be sections of larger elements, which have a corresponding trough-like section as a trough-like element. However, it is preferred if the trough-like elements are formed over the entire part and/or are completely trough-like, in particular if the part has no non-trough-like sections.

In particular, it is preferred if the trough-like elements are uniform over their entire lengthwise extent, for example if in cross-section they have an identical cross-sectional area and/or material thickness and/or are identically formed. This does not apply to connecting elements, for fastening other elements, such as threaded inserts for tethering additional parts. In particular, it is preferred if the trough-like elements, with respect to the portion formed of fiber composite materials, are uniform over their entire lengthwise extent, for example if in cross-section they have an identical cross-sectional area and/or material thickness and/or are identically formed. It is harmless if the trough-like elements in selected sections, for instance, in sections for connecting axles and/or other underframe sections or drawbar heads, are reinforced with other, also trough-like, reinforcing elements, for instance inside and/or outside, which are or become in particular glued to the trough-like elements, or are formed with tethering means for reinforcing elements. The tethering means can be formed for instance by tethering elements, such as those for non-positive and/or positive tethering of reinforcing elements. Reinforcing elements can be, for instance, elongated elements, such as bars or struts, predominantly planar components, for example embodied as bulkhead plates or walls in the trough-like elements or braced in a surface to serve as transverse and/or diagonal stiffening and preferably internal, or trough-like reinforcing elements. Reinforcement elements braced in a surface are, in particular, elements formed as planar having recesses, in particular regular recesses, and are in particular designed like trusses or honeycombed. In particular, this refers to reinforcing elements, which are and/or will be formed from intersecting elongated elements, which are arranged in one surface. To this end, individual elements do not have to be connected, but the structure can also be integrally formed. In the case of a planar design, it can be assumed that the arrangement has a greater extension in the direction of the width and length of the surface than height-wise. In particular, the height does not exceed 10 mm, in particular not 5 mm.

The tethering elements can be implemented, for instance, in the form of grooves and/or springs. Trough-like reinforcing elements are particularly designed to nestle against the inside or outside of the trough-like element. They are, in particular, connected to the trough-like elements such that the trough-like reinforcements lie flat against the trough-like elements. Such reinforcing elements and/or tethering elements are not only not harmful, but rather are preferred. It is preferred if reinforcing elements and/or tethering elements are provided extending over a maximum of 70%, in particular over a maximum of 50%, of the lengthwise extent of the trough-like elements. It is also harmless if the trough-like elements have tethering elements, in particular metallic ones, in some areas.

Advantageously the trough-like elements are each integrally formed. They are advantageously designed such that they cannot be disassembled in a nondestructive manner. In a preferred embodiment, they are each formed of three parts connected to each other, in particular in such a manner that they cannot be disassociated in a nondestructive manner. The three parts are advantageously formed of a fiber composite material. Of the three parts, in particular one part is a bottom element, in particular configured as flat, and the two other parts each have, in particular, at least one bottom section and one flank section and optionally a tethering section. Their cross section is formed in particular as Z-shaped, and in particular, at least regarding their fiber composite material portion, they are formed identically. In particular, in such an embodiment the trough-like elements are formed in such a manner that the three parts are glued to one another. In particular, in such an embodiment the trough-like elements are formed such that the bottom sections of the other two parts are aligned with each other and are disposed next to each other and/or adjacent to each other, such that the flank sections are outside relative to the bottom sections and the bottom sections are connected to each other via the bottom element, forming a trough-like element.

In a further preferred variant, the trough-like elements are each made integrally such that they are created entirely of fiber composite material in a single process.

In particular, the binding agent of each trough-like element and/or of each of the components that make up the trough-like elements, in particular the three parts mentioned, is/will be cured in one process step.

In particular, every trough-like element and/or each of the components that make up the trough-like elements, in particular integral trough-like elements and/or the three parts mentioned, is/will be produced in a continuous process, in particular in a pultrusion process.

In particular, every trough-like element and/or each of the components that make up the trough-like elements, in particular the three parts mentioned, is/will be produced in at least one endless or continuous process, in particular a pultrusion process. With particular advantage, identical parts are produced in a joint endless or continuous process. A process or method as defined by this description is endless or continuous, if several components are produced without interruption as a common component to be separated later. The amount of elements contained in the common component and separated later or the length of the endless or continuous process is limited in particular by the supply of feedstock, in particular their length, for instance the length of fiber mats, if these cannot be linked.

In particular, every trough-like element and/or each of the components that make up the trough-like elements, in particular the three parts mentioned, is/will be produced using at least two fiber mats arranged one above the other. The fiber mats may be formed, for instance, as a scrim or fabric. In particular, at least one layer of fiber mats is included having a fiber orientation of 0° and/or 90° in relation to the lengthwise extent of the component, and one or more layer(s) of fiber mats having fiber orientations of preferably between ±30° and ±60° in relation to the lengthwise extent of the component. Fiber orientations of 0°, i.e. those which run in parallel to the lengthwise extent of the component, may also, in particular, be implemented not by fiber mats but rather by fiber bundles, so-called "rovings".

In a preferred alternative embodiment, the bottom and flanks of the trough-like elements are/will be constructed identically, in particular using the same fiber layers. In another preferred embodiment variant, the bottom and flanks of the trough-like elements are/will be constructed differently, in particular using at least partially different fiber layers.

With particular advantage, the trough-like elements, at least in partial areas, in particular in those partial areas which are in contact with metal or are provided for such contact, in particular in tethering areas, have one, in particular upper, fiber layer of glass fiber and/or another insulator. With particular advantage, the trough-like elements, at least in partial areas, in particular in adhesive areas, i.e. those areas, which are intended for subsequent bonding, have tear-off fabric as the topmost layer.

With particular advantage, the trough-like elements have metallic tethering elements. These can be introduced, for instance, during the formation of the trough-like elements, in particular before the curing of a binding agent of the fiber composite material, of which the trough-like elements can be formed. Thus, for instance, metallic tethering elements having a massively enlarged surface with or without threading can be introduced in the fiber composite material before the curing of the binding agent, for instance a resin. A massively enlarged surface is present, in particular, when the surface is increased by at least 200% compared with an imaginary averaged surface; this can be achieved, for instance, by means of a surface having a multiplicity of spikes.

Another option for introduction, especially when using thermoplastic binding agents in the fiber composite, is the subsequent introduction, for instance, after partial and/or local softening and/or melting of the thermoplastic binding agent. In particular, the softening and/or melting or a further softening and/or melting can be used to attach the metallic tethering element to the thermoplastic binding agent existing in the trough-like element prior to the introduction.

Particularly advantageously, the self-supporting underframe has a front underframe as a tethered construction, attached at a first end, in particular at the first end of the monocoque and/or of the at least one cover element, in particular strut cover element, said front underframe including, in particular, a cross-bracing between the two monocoques, and in particular having a receptacle or suspension for an axle, and in particular not being made, or at least not predominantly made, of fiber composite material.

The self-supporting underframe itself has two mutually parallel monocoques, spaced apart, elongated, and closed at least 50% on at least four sides. These four sides are, in particular, the longitudinal sides and not the front and end faces. The monocoques themselves in turn each have an integral trough-like element comprising at least one lower bottom and two side walls extending upward from the bottom, also called flanks, and at least one cover element that closes off the trough-like element, in particular on one side, over at least 50% of the lengthwise extent of the trough-like element. The at least one cover element of each of the two monocoques has or contains at least one cross-bracing strut cover element. The strut cover element of the two monocoques is designed as a joint integral strut cover element spanning an interstice located between the monocoques. In other words, the underframe according to the invention comprises at least one integral strut covering element, which is part of each of the at least two monocoques and at least partially closes these and spans the interstice between the monocoques. In this case, the entire length of the interstice, i.e. in the direction parallel to the longitudinal extent of the trough-like elements of the monocoques, does not have to be spanned. Recesses may be provided here, for instance. Particularly preferred is an embodiment in which the interstice is spanned only where central crossmembers, in particular central crossmembers having a trough-like element, are arranged.

Several strut cover elements can also be provided, for example a front and a rear one, for instance in the first section or in the second section, partially closing the trough-like elements of the monocoques. Most importantly, however, there has to be at least one integral connection from one monocoque to the other, formed by a strut cover element. The element is designed as integral for the integral connection between the monocoques. It is integrally designed, if it is formed from one part, for instance a steel plate, or from several parts, which are connected such that they cannot be detached or cannot be disassembled in a nondestructive manner from each other, for instance, a fiber composite plate. It is harmless if other parts, including cover elements, are releasably and/or permanently attached to the strut cover element.

With particular advantage, only one cover element designed as a strut cover element is included in the underframe.

With particular advantage, the at least one strut cover element is designed as a sandwich panel.

With particular advantage, one end of the at least one strut cover element protrudes in the lengthwise extent of the monocoque over the same, especially in the direction of travel at the rear end. The monocoques are advantageously arranged in parallel to the direction of travel. With particular advantage, the monocoques each have at one end, in particular at a front end in the direction of travel, a transition section in particular integrally formed with the trough-like element and/or firmly connected to the same, extending inwards and/or upwards and/or extending downwards from the monocoque, and adjoined, in turn, by a connecting section extending in parallel to the lengthwise extent of the trough-like elements, said connecting section being, in particular, firmly connected to the trough-like element and/or integrally formed therewith. The transition section is, in particular, made of carbon fiber composite material and/or glass fiber composite material, in particular entirely. It is particularly designed as trough-like or tubular.

Advantageously, the at least one cover element, in particular strut cover element, forms the bottom plate of the land vehicle whose underframe is partially formed by the at least one cover element.

The thickness of the cover elements, in particular of the strut cover element, is advantageously 20-120 mm. The cover elements and/or the strut cover element have/has in particular a core, which is closed off on at least two sides by cover layers. The core consists in particular of foam, stitched foam, a honeycomb structure, resin, and/or wood. The cover layers consist in particular of fiber composite material, metal, and/or wood, in particular of carbon fiber and/or glass fiber composite material. The cover layers have, in particular, a thickness of 0.5 to 5 mm. Stitched foam is a structure, where foam is introduced between at least two interconnected, especially sewn, fiber layers, which may be part of the cover layers. The binding agent introduced into the fiber layers for curing purposes is introduced and cured in such a way that it also partially flows into and/or around the connection of the fiber layers and during curing produces hard and/or stiff connections between the fiber layers and through the foam. Such an arrangement can be used as a cover element and in particular as a strut cover element.

Furthermore, the monocoques are advantageously formed such that they each have a first section and a second section, wherein the second section, in a center plane extending through the two monocoques, parallel to the lengthwise extents of the trough-like elements of the two monocoques, has a greater extent than the first section, perpendicular to the lengthwise extent of the trough-like element of the monocoque. Where this text refers to the lengthwise extent of a monocoque, this shall be understood to mean the lengthwise extent of its trough-like element. In general parlance, said section therefore has a greater width than the first one. Furthermore, every monocoque has a third section located between the first and the second section in the direction of its lengthwise extent, which third section has a decreasing extent over its lengthwise extent from the second and first section, in general parlance a decreasing width.

A self-supporting underframe is characterized in particular by the fact that it does not require any additional stiffening elements over at least 30%, in particular 50%, of its lengthwise extent in order to be stiff and stable in itself. In particular, it requires no further stiffeners. In particular, the underframe is not accommodated in a trough and/or the monocoques are surrounded by additional material, for instance reinforcements, at the bottom and/or downwards and/or at the side facing away from the at least one cover element, over at most 30%, in particular at most 50% of their length, in particular they are not surrounded by any additional material at the bottom and/or downwards and/or at the side facing away from the at least one cover element. With particular advantage there is no element below the cover elements that spans the interstice between the trough-like elements and the trough-like elements, in particular the underframe contains no elements that span the interstice between the trough-like elements and the trough-like elements, besides the at least one cover element. In particular, the underframe does not have any longitudinally supporting and/or longitudinally stiffening elements and/or structures at least over 30%, in particular 50%, preferably 100%, of the lengthwise extent of the trough-like elements, except for the monocoques comprising the trough-like elements and/or for the cover elements, i.e. in particular the longitudinal stiffening is implemented at least over 30%, in particular 50%, preferably 100%, of the lengthwise extent of the trough-like elements solely by the monocoques containing trough-like elements and/or by the cover elements.

In particular, at least over 30%, in particular 50%, preferably 100%, of the lengthwise extent of the trough-like elements, no stiffening and/or load-bearing elements are/will be arranged next to the outer side walls of the trough-like elements. The outer side walls are those that do not face another trough-like element.

With particular advantage, the cover plates and/or strut cover elements are homogeneously executed in their planar extent, except for recesses, for instance for wheel arches or bushings, cable ducts, cable tunnels and/or except for local reinforcements, in particular for the tethering of walls, for instance by a circumferential section for the tethering of exterior walls, and interior fittings, such as shelves, and/or except for a honeycomb structure that breaks up the homogeneity on a small scale, and/or projections upwards for wheel arches. In particular, they have no reinforcements and/or stiffeners, apart from the above-mentioned exceptions.

With regard to homogeneity in the planar extent of the cover elements, a layered structure is irrelevant, as the layers are arranged one above another perpendicular to the planar extent. The homogeneity is broken up by a honeycomb structure on a small scale in that the honeycombs have walls and cavities or walls and differently filled interstices. This is advantageously ignored when considering whether homogeneity is present.

Preferably, the cover plates and/or strut cover elements are designed as planar and/or as plate-like. In particular, they have no circumferential projections and/or projections extending along at least one side, at least no circumferential projections and/or projections extending along at least one side having a height of more than 1 cm.

With particular advantage, side walls are circumferentially tethered to the cover elements, in particular designed as a single strut cover element, in particular using a circumferential L-shaped profile. In particular, the side walls are mounted on the face in front of the at least one cover element, and in particular this connection between the side wall and the cover elements is enclosed by an L-shaped section. The L-shaped profile is particularly arranged such that it abuts at least one side wall and at least one cover element on the inside of its legs. In particular, the strut cover element has a layered structure having at least three layers, an inner one of which is a foam layer and/or honeycomb layer, or an at least two-layer structure having a covered foam and/or honeycomb layer is located on the strut cover element. By arranging the side walls at the front faces of the strut cover element, the foam layer, which would otherwise be open at the front faces, can be enclosed on all sides. With regard to the various sections of the monocoques in their lengthwise extent, it should be noted that there are various arrangements and length ratios they can be selected from. It is particularly preferred to arrange the first section at one and/or the first end of the individual monocoque or in the region of 20% of the lengthwise extent of the individual monocoque starting from one and/or the first end. The decreasing extent of the third section can also be implemented in various ways. It can decrease sharply (in one discrete step) or be implemented, for instance, by a taper or continuous tapering. Other kinds of deformations, such as a continuous widening of the monocoque, for instance in the third section, are also not precluded. The monocoque may also have additional sections.

The monocoques are spaced apart, in particular by 0.5 m to 2 m. In particular, they are spaced apart by at least the greatest width of one of the monocoques and/or the distance between the side walls of a monocoque, in particular by twice the maximum width of one of the monocoques and/or the distance between the side walls of a monocoque. For that purpose, the width extends in the direction of the distance between a first and a second of the two monocoques.

The trough-like elements have, in particular, a lower width of the bottom of 5 cm to 30 cm. The adjoining flanks run in particular at an angle of 0 to 20°. The angle is measured on the inside of the trough-like element between the bottom and the flank. The length and/or height of the flanks is, in particular, 5 cm to 50 cm. Advantageously, the wall thickness of the trough-like elements is 2 mm to 15 mm over at least 80% of their length, in particular over their entire extent. The trough-like elements are in particular formed integrally. In particular, they have no joints over their lengthwise extent at which two or more parts adjoining one another in the longitudinal direction have been connected to one another with or without overlap. A fiber composite part that has adjoined fibers or fiber mats does not count as two parts that have a joint in the longitudinal direction.

The weight of the duocoque, formed in particular by two trough-like elements and one or more strut cover element(s) and optionally one or more cross-bracing(s), is in particular less than 5%, in particular less than 2%, of the gross vehicle weight of the underframe and/or of the vehicle, part of which the underframe is or will become. In particular, it does not weigh more than 120 kg for a vehicle of up to 4.25t gross vehicle weight.

Furthermore, it is particularly advantageous to provide at least one central cross-bracing extending between the two monocoques. The at least one advantageous central cross-bracing is in particular firmly connected to the two monocoques and/or the at least one strut cover element, in particular using binding agents.

Various structures can be considered as cross-bracings. Struts made of materials other than that of the monocoques can also be used for this purpose. In a possible embodiment, cross-bracings are provided, which are also made of the same material as the monocoques and/or also have a bottom and two side walls extending upwards therefrom, in particular formed having an identical cross section to that of the trough-like elements and/or manufactured in the same continuous process as at least one of the trough-like elements and in particular also closed at the top, in particular by one of the cover elements of the monocoque, in particular by the at least one strut cover element. In this case, a closure of at least 50% is preferred.

With particular advantage, the two monocoques have along their lengthwise extent only the first section, the third section adjoining thereto and the second section adjoining the third section. In general, the second section, due to its greater width, is in particular provided to increase the transverse stability of the underframe. In the area of the first section, sufficient transverse stability can generally be achieved by means of a further structure attached thereto, which in particular forms a front part of an overall underframe.

If it has further sections, such as a fourth section adjoining the second section, further functionalities can be introduced. For instance, a terminal slope angle can advantageously be provided in the monocoques such that their height decreases upwards from the bottom to the cover element. With particular advantage, the at least one central cross-bracing or, in the case of several central cross-bracings, at least one of these central cross-bracings, is embodied as an integral trough-like element comprising at least one bottom and two side walls extending upward from the bottom and at least one cover element closing the trough-like element over at least 50% of the lengthwise extent of the trough-like element. In this case, the cover element is firmly connected to the side walls, in particular using binding agents. In particular, the at least one cover element is part of the at least one strut cover element, in particular integrally formed with the latter. In particular, the central cross-bracing may have trough-like elements, which are formed like an area of the trough-like elements of a monocoque.

With particular advantage, at least two central cross-bracings are provided. Thus, provided the central cross-bracings are arranged at a suitable distance from one another, a sufficient transverse stability over the entire length of the underframe can be achieved.

With particular advantage, a fourth section is provided, which adjoins the second section or is arranged at an end opposite of the first section of the monocoque. This section, or the second section, in particular if it is arranged terminally along the lengthwise extent of the monocoque, tapers height-wise or with regard to the inner clearance with particular advantage to the end facing away from the first end of the lengthwise extent. In this case, it tapers in particular such that the bottom rises in the direction of the at least one cover element. The inner clearance designates the height resulting as clearance in a monocoque that is hollow inside. If the cross section of the monocoque thus has circumferential walls, the internal clear space in this cross section shall be understood to mean the clearance.

With particular advantage, the fourth and/or the third section taper(s) in a central plane towards the longitudinal end facing away from the first end, in particular in all central planes through the two monocoques in parallel to the lengthwise extent of the two monocoques, perpendicular to the lengthwise extent of the monocoque along its outer and/or inner clear extent, and/or in its cross section and/or in its clearance cross section. In such an embodiment, the taper of the extent or inner clear extent is located in the width of the monocoque. By means of such a configuration, on the one hand material can be saved at the area subject to lower stresses, in particular at one end of the monocoque, and on the other hand more room to move the vehicle freely off-road can be attained because the monocoques then have a reduced dimension towards the end of the vehicle resulting in a reduced risk of collision.

With particular advantage, the second section has a greater extent than the first section in all center planes through the two monocoques, in parallel to the lengthwise extent of the two monocoques, perpendicular to the lengthwise extent of the monocoques. That is, it has a greater width. With particular advantage, the third section of every monocoque has, over its lengthwise extent from the second to the first section, a continuously tapering extent, i.e. width, in all center planes. The same applies to the inner clear extent and the cross section of the sections. Furthermore, with particular advantage, the bottoms and side walls of the monocoques are each formed having a constant wall thickness along their lengthwise extent.

With particular advantage, the wall thicknesses of the floors and side walls of the monocoques are designed as identical. Furthermore, with particular advantage, the extent, the inner clear extent, the outer cross section and/or the inner clear cross section of the first and/or second section are constant along the lengthwise extent of the individual section. With particular advantage, the extent, the inner clear extent, the outer cross section and/or the inner clear cross section of the first section are designed as different by at least a factor of two from the extent, the inner clear extent, the outer cross section and the inner clear cross section of the second section. The second section in each case has a larger extent or a larger cross section.

With particular advantage, the heights of the extent of the monocoques and the central cross-bracings between the bottoms and the cover elements are identical. In particular, they therefore have an identical height, in particular an identical maximum height. In particular, the monocoques and/or cross-bracings may also have areas of a lower height, in particular by making the bottoms bulge in the direction of the cover elements. This is particularly advantageous for accommodating additional components, such as bushings, shafts, and/or axles.

Thus, in particular, the monocoques advantageously each have at least one axle section, in which the bottom of the monocoques has a bulge in the direction of the at least one cover element. There, the monocoques have a reduced minimum height in this axle section, wherein in particular the upper edge of the side walls remains on one plane and only the bottom bulges upwards. With particular advantage, the side walls in this area are also designed such that their lower edge also bulges upwards similar to the bulge of the bottom and thus creates a clear area in the axle section.

With particular advantage, the lengthwise extent of the at least one central cross-bracing is arranged perpendicular to the lengthwise extent of the monocoques. A central cross-bracing formed like a trough, for instance for receiving batteries or tanks, is to be arranged in particular with its lengthwise extent in parallel to the lengthwise extent of the monocoque. In particular, it is to be arranged such that its transverse extent is perpendicular to the lengthwise extent of the monocoque.

With particular advantage, the monocoques are designed to be hollow, apart from inner cross-bracings, constituting the reinforcing elements. Such inner cross-bracings, which constitute reinforcing elements, are arranged in particular in the second section of every monocoque, in particular at least two per monocoque. Such cross-bracings are in particular designed as planar cross-bracings, arranged in particular perpendicular to the lengthwise extent of the monocoques and/or diagonally extending between the side walls of the trough-like elements, for instance in the manner of stiffening plates or bulkheads, and are in particular arranged in areas where axles are to be or are mounted under the underframe. They serve for further reinforcement in the transverse and/or longitudinal direction, for instance in the area of the axles. In particular, axle sections have inner cross-bracings and/or inner cross-bracings are arranged adjacent to axle sections in the monocoques, in particular on both sides.

Even if the monocoques are designed hollow as such, in particular, with the exception of the inner cross-bracings, it is conceivable to arrange additional functional elements accommodated therein. Thus, within the per se hollow monocoques, lines, controls, memory devices, actuators, measuring instruments and/or other functional elements may be arranged or installed.

Also, the one or more central cross brace(s), if provided, is/are with particular advantage formed to be hollow inside. This applies to the supporting structure of the cross-bracing. This is also hollow if, for instance, other elements, such as tanks, compressors, lines, controls, memory devices, actuators, measuring instruments and/or other functional elements are arranged therein.

With particular advantage, the length of the third section in the lengthwise extent of the monocoque is shorter than the length of the second section, in particular also than that of the first section. With particular advantage, the length of the first and/or the length of the third section of every monocoque is at least 10% of the length of the monocoque. With particular advantage, the length of the second section of every monocoque is at least 20% of the length of the monocoque.

By such an arrangement, a particularly weight-efficient design can be achieved.

With particular advantage, the monocoques are closed on at least five sides, in particular on five sides. In particular, they are designed to be open at the first end.

With particular advantage, the monocoques are designed to be identical and/or mirror images of each other. This facilitates fabrication and constitutes a particularly material-efficient design. With particular advantage, their bottoms are arranged on a common plane. Thus, in particular, their maximum downwards extents are arranged on a common plane. Furthermore, the two monocoques are in particular arranged as mirror images in relation to a plane perpendicular to the common plane. This means that the monocoques are not only arranged in parallel, but are arranged as symmetrically placed as possible. In particular, their lengthwise extents together with connecting lines between the respective ends of the lengthwise extents of the two monocoques, i.e. a first end of the lengthwise extent of the first monocoque with a first end of the lengthwise extent of the second monocoque and a connecting line between the second end of the lengthwise extent of the first monocoque and the second end of the lengthwise extent of the second monocoque, form a rectangle arranged in one plane.

With particular advantage, the height of the monocoques and/or of the central cross-bracings and/or the distance between the bottoms of the monocoques and/or central cross-bracings from the cover element, with the exception of the axle sections, is constant. With particular advantage, the side walls of the monocoques and/or central cross-bracings are arranged such that they extend from the ground upwards in the direction of the at least one cover element moving slightly away from each other toward the outside, i.e. have a certain opening angle. In addition, the side walls of every monocoque and/or the side walls of the at least one central cross-bracing each have outwardly extending adhesive surfaces, which are in particular arranged parallel to each other and/or to the bottom and/or cover element. In particular, the at least one cover element is firmly connected to the trough-like element using binding agents on the adhesive surfaces.

With particular advantage, the adhesive surfaces each have a constant width over the lengthwise extent of the monocoques and/or central cross-bracings. In particular, the width of the adhesive surfaces of the monocoques is identical to the width of the adhesive surfaces of the central cross-bracings.

Such a type of connection of trough-like element and cover element can be used to achieve a particularly material-efficient and stiff connection.

With particular advantage, the self-supporting underframe is predominantly formed of fiber composite material, in particular of carbon fiber composite material. In particular, it is formed exclusively of fiber composite material, in particular of carbon fiber composite material and binding agents.

With particular advantage, the trough-like element of one of the central cross-bracings, in particular the one facing away from the first end and/or a central cross-bracing arranged in the second section, is such that its lengthwise extent and in particular its inner clear lengthwise extent is arranged in the lengthwise extent of the monocoque and is in particular larger than the distance between the two monocoques from each other. Such a central cross bracing is particularly suitable for receiving tanks and/or batteries.

With particular advantage, three central cross-bracings are provided. In particular, two narrower central cross-bracings are arranged between the first sections of the monocoques, and in particular one wider cross-bracing, designed as a cross-bracing having a long trough, is arranged between the monocoques facing away from the first end, in particular or exclusively in the area of the second section. A cross-bracing having a long trough is in particular not directly connected to the trough-like elements of the monocoque, but is in particular connected to the cover element via adhesive surfaces.

With particular advantage, at least one central cross-bracing is provided at least between the second sections and/or the first sections.

The maximum height of the monocoques is in particular at least 100 mm. In particular, the height of the monocoques is at least 100 mm over at least 50% of their length.

With particular advantage, the maximum height of the side walls of the monocoques is at least 100 mm, in particular the height of the side walls is at least 100 mm over at least 50% of the length of the monocoques.

With particular advantage, the minimum thickness of the strut cover element is at least 2 mm.

With particular advantage, the inner clear extent of the monocoques in the first section is 40 mm to 300 mm and/or in the second section is 80 mm to 600 mm. With particular advantage, the outer extent, the outer width, of the monocoque in the first section is at least 80 mm and/or a maximum of 300 mm and/or in the second section at least 100 mm and/or a maximum of 900 mm. With particular advantage, the distance between the monocoques is at least 400 mm. Particularly advantageously, the distance between the side walls of the monocoques facing each other is at least 400 mm, in particular, the distance between the side walls of the monocoques facing each other is at least twice the inner clear extent at the location of the minimum distance between the side walls of the monocoques, which are facing each other.

With particular advantage, the length of every monocoque is at least 1 m.

The problem is also solved by a land vehicle, comprising an underframe according to the invention, wherein at the first end a vehicle element attached as a tethered structure, having at least one front axle, is attached, in particular bolted and/or glued on. The problem is also solved by a land vehicle, comprising an underframe according to the invention, wherein at least one rechargeable battery and/or one tank is held within at least one central cross-bracing, in particular formed to be a long trough.

BRIEF DESCRIPTION OF THE SEVERAL VIEWS OF THE DRAWINGS

Further advantageous embodiments and features shall be explained purely by way of example and not exclusively with reference to the purely schematic and non-limiting drawings. In the figures.

DETAILED DESCRIPTION

Figure 1:
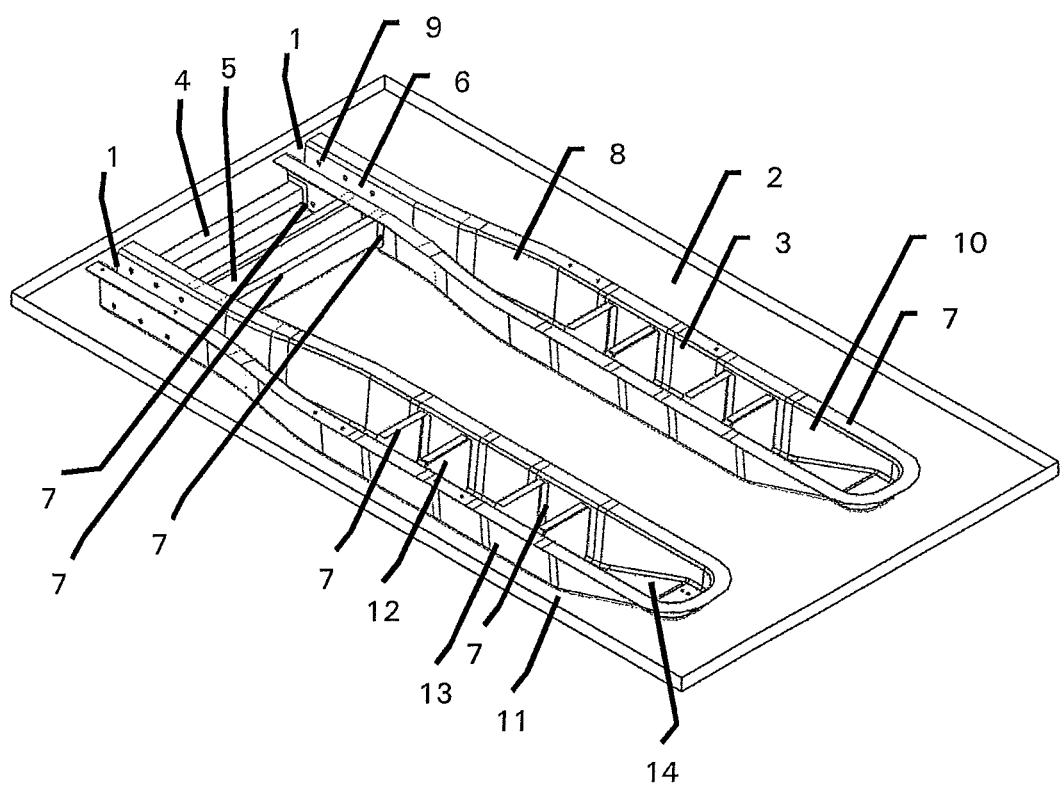
FIG. 1 shows a view of a chassis according to the invention, but with transparent cover elements.

FIG. 1 shows an illustration of an underframe according to the invention having transparent cover elements.

A trough-like element 1 of a first monocoque and a trough-like element 1 of a second monocoque are visible. Thereon a cover element 2 is arranged. These are arranged in parallel to each other at a distance. Between these and connected to the same two central cross-bracings are shown. One of the central cross-bracings is designed as a cross-bracing 4 having a rectangular cross section. The second central cross-bracing is designed as a trough-like element 5, which is also closed by the cover element 2 and connected thereto by way of adhesive surfaces 7 using binding agents. The cross-bracing 4 and the trough-like element 5 are connected to the trough-like elements 1 of the monocoques using binding agents on adhesive surfaces 7. The trough-like elements 1 of the monocoques are closed on four sides and have a bottom 14, two side walls 13, and adhesive surfaces 7. The trough-like elements 1 of the monocoques and thus the monocoques as such have a first section 6, a second section 3 and a third section 8 and a fourth section 10. The first section 6 is narrower than the second section 3. The third section 8 tapers from the third section 3 to the first section 6. The fourth section tapers in its width and height. For the height-wise tapering the bottom 14 extends upwards in a slope angle 11. In the first sections, which adjoin a first end of the trough-like elements 1 of the monocoques, means in the form of drill holes 9 are provided for bolting the monocoques to a structure to be tethered as an additional component of an overall underframe. Inner cross-bracings 12 are arranged within the trough-like elements 1 of the monocoques in the second sections 3. They are designed as planar inner cross-bracings 12 and are arranged perpendicular to the lengthwise extent of the trough-like elements 1 of the monocoques and are connected to these and to the cover element 2 using binding agents on adhesive surfaces 7. The cover element 2 is designed to be continuous and also projecting beyond the trough-like elements 1 of the monocoques on all sides. It can also be customized such that, for instance, it has recesses between the trough-like elements 1, in particular at locations where no trough-like elements of central cross-bracings are arranged.

Figure 2:
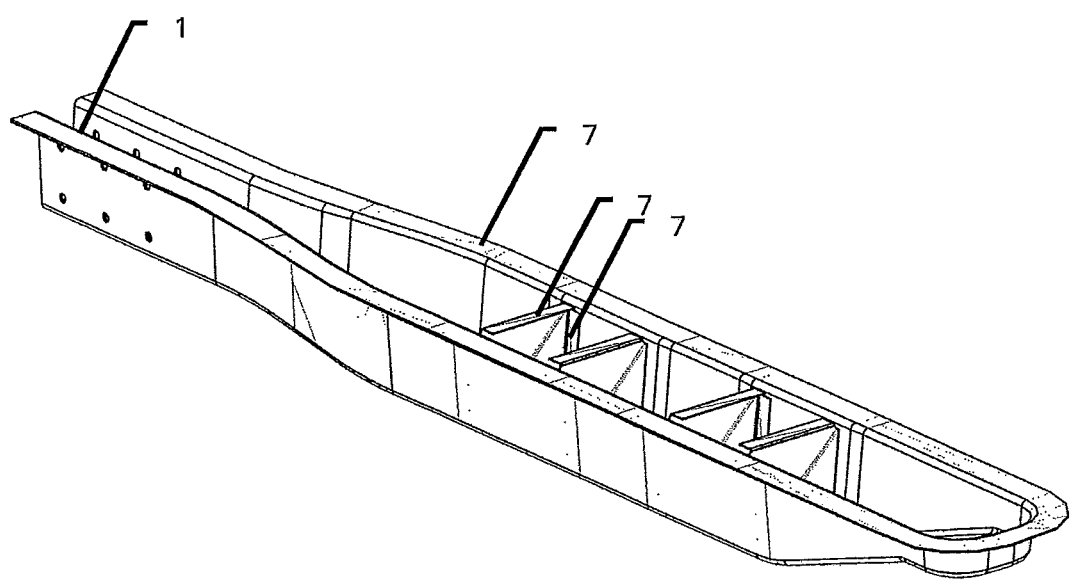
FIG. 2 shows a drawing of a trough of a monocoque from FIG. 1.

FIG. 2 shows a trough-like element 1 from FIG. 1 having inner cross-bracings 12.

Figure 3:
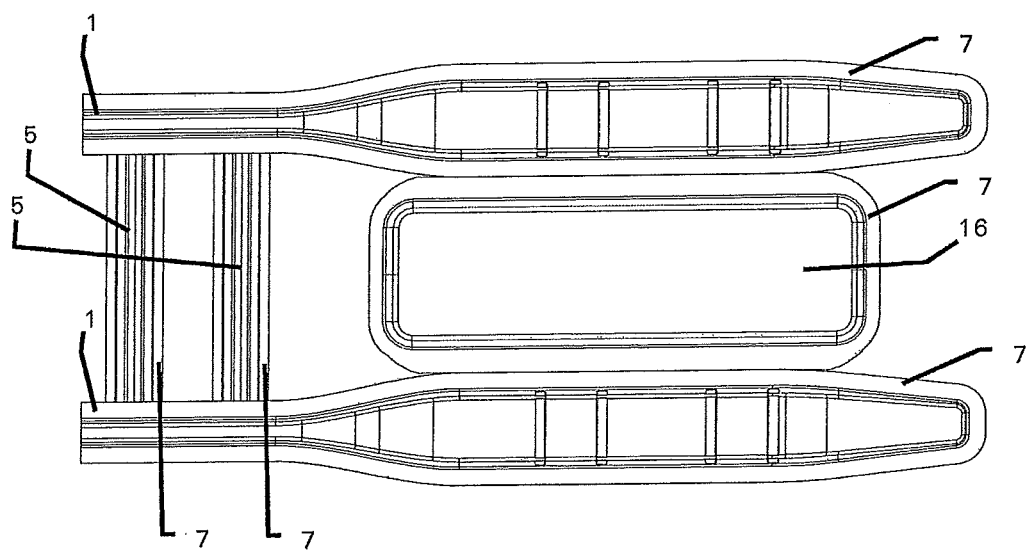
FIG. 3 shows an illustration of an underframe without a cover element.

FIG. 3 shows two trough-like elements 1 of two monocoques, formed as in FIGS. 1 and 2. However, in the front region two trough-like elements 5 are arranged as part of central cross-bracings between the trough-like elements 1 of the monocoques. In the area of the second sections and partly in the area of the third and fourth sections, a further trough-like element 16 designed as a long trough is arranged between the trough-like elements 1 of the monocoques. The trough-like elements 1, 5, 16 have adhesive surfaces 7 for connection to a cover element by means of binding agents.

The invention claimed is:

1. A self-supporting underframe for a vehicle, in particular a land vehicle, and/or for a land vehicle comprising a self-supporting underframe, wherein the underframe comprises:
   two elongated monocoques arranged in parallel, spaced apart from each other, and at least 50% closed on at least four sides, wherein the monocoques each have an integral trough-like element having at least one lower bottom and two side walls extending upwards from the bottom; wherein the trough-like element is integral and made entirely from pultruded fiber composite material; and
   at least one cover element closing the trough-like elements over at least 50% of the lengthwise extent of the respective trough-like element, wherein the at least one cover element of each of the two monocoques comprises at least one strut cover element, and the strut cover elements of the two monocoques are formed as a common integral strut cover element spanning the interstice located between the trough-like elements of the monocoques, and the strut cover elements are firmly connected to the side walls of the monocoques using a binding agent.

2. The self-supporting underframe and/or land vehicle according to claim 1, comprising at least one central cross-bracing extending between the two monocoques, wherein the at least one central cross-bracing is firmly connected to the two monocoques.

3. The self-supporting underframe and/or land vehicle according to claim 2, wherein the at least one central cross-bracing comprises an integral trough-like element having at least one lower bottom and two side walls extending upwards from the bottom and at least one cover element closing the trough-like elements over least 50% of the lengthwise extent of the individual trough-like element, and the at least one cover element is firmly connected to the side walls.

4. The self-supporting underframe and/or land vehicle according to claim 3, wherein the at least one cover element is firmly connected to the side walls using binding agents.

5. The self-supporting underframe and/or land vehicle according to claim 3, wherein the at least one cover element is part of the at least one strut cover element.

6. The self-supporting underframe and/or land vehicle according to claim 1, further comprising one or more inner cross-bracings provided within the monocoques; and wherein the monocoques are hollow except for the inner cross-bracings.

7. The self-supporting underframe and/or land vehicle according to claim 1, wherein the trough-like elements have reinforcing elements or connecting elements for reinforcing elements over a maximum of 70% of their lengthwise extent.

8. The self-supporting underframe and/or land vehicle according to claim 1, wherein an inner cross-bracing or central cross-bracings are arranged perpendicular to the lengthwise extent of the monocoques.

9. The self-supporting underframe and/or land vehicle according to claim 1, wherein the two monocoques are identical and their bottoms are arranged on a common plane, and the two monocoques are arranged as mirror images of each other in relation to a plane perpendicular to the common plane.

10. The self-supporting underframe and/or land vehicle according to claim 1, wherein the trough-like elements have adhesive surfaces extending parallel to one another from the ends of the side walls facing away from the bottoms, wherein the at least one cover element is connected to the trough-like elements using binding agents on the adhesive surfaces.

11. The self-supporting underframe and/or land vehicle according to claim 10, wherein the adhesive surfaces have a constant width over the lengthwise extents of the monocoques or of central cross-bracings.

12. The self-supporting underframe and/or land vehicle according to claim 10, wherein the trough-like elements have adhesive surfaces extending parallel to one another from the ends of the side walls facing away from the bottoms and extending outwards from the side walls.

13. The self-supporting underframe and/or land vehicle according to claim 1, wherein at a first end, a vehicle element having at least one front axle is mounted, or the monocoques have devices for bolting to an underframe or a cabin in the first section or at the first end.

14. The self-supporting underframe and/or land vehicle according to claim 13, wherein the vehicle element is a tractor having at least one front axle bolted at a first end.

15. The self-supporting underframe and/or land vehicle according to claim 1, wherein the two monocoques have along their lengthwise extent only the first section, the third section adjacent thereto and the second section adjoining the third section.

16. The self-supporting underframe and/or land vehicle according to claim 1 wherein the monocoques are closed on five sides.

17. A method for producing a self-supporting underframe for a land vehicle and/or a land vehicle having a self-supporting underframe comprising the following steps for the production of the underframe:

providing two elongated trough-like elements comprising at least one lower bottom and two side walls extending upwards from the bottom, or two elements each having at least one elongated trough-like section having at least one lower bottom and two side walls extending upwards from the bottom; wherein each trough-like element is formed entirely as an integral unit from fiber composite material in a pultrusion process;

providing at least one strut cover element; and connecting the two trough-like elements and the at least one strut cover element using binding agents, such that the trough-like elements are disposed in parallel to each other and are partially closed by the at least one strut cover element, wherein over at least 50% of the trough-like elements are closed by the at least one strut cover element, and two monocoques are formed in parallel to each other and wherein the two trough-like elements and the at least one strut cover element are arranged such that the at least one strut cover element spans an interstice located between the trough-like elements and the at least one strut cover element is firmly connected to the side walls of the monocoques by the binding agents.

18. The method according to claim 17, including the production of a land vehicle having a chassis, wherein the underframe is the chassis or part of the chassis.

\* \* \* \* \*